(12) United States Patent
Uozumi et al.

(10) Patent No.: US 8,105,454 B2
(45) Date of Patent: *Jan. 31, 2012

(54) FILAMENT WINDING APPARATUS AND METHOD THEREOF

(75) Inventors: Tadashi Uozumi, Kyoto (JP); Motohiro Tanigawa, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 255 days.

This patent is subject to a terminal disclaimer.

(21) Appl. No.: 12/464,709

(22) Filed: May 12, 2009

(65) Prior Publication Data

US 2009/0314418 A1 Dec. 24, 2009

(30) Foreign Application Priority Data

Jun. 20, 2008 (JP) ................... 2008-161521

(51) Int. Cl.
*B29C 53/00* (2006.01)
*B65H 81/00* (2006.01)

(52) U.S. Cl. ........ 156/175; 156/166; 156/169; 156/172; 156/173; 156/425; 156/428; 156/429; 156/430; 156/431; 156/432; 242/439.4; 242/439.5

(58) Field of Classification Search .................. 156/166, 156/169, 171–173, 175, 187, 188, 190, 195, 156/425, 428, 430–432, 523, 574; 242/439.4, 242/439.5

See application file for complete search history.

(56) References Cited

U.S. PATENT DOCUMENTS

| 7,810,753 | B2 * | 10/2010 | Uozumi et al. ............... 242/444 |
| 2002/0139430 | A1 * | 10/2002 | Amano et al. ................ 138/153 |
| 2003/0051795 | A1 * | 3/2003 | Burgess ......................... 156/169 |
| 2008/0197229 | A1 | 8/2008 | Uozumi et al. |
| 2009/0038759 | A1 | 2/2009 | Uozumi et al. |

FOREIGN PATENT DOCUMENTS

| EP | 0036447 A1 | 9/1981 |
| EP | 1958758 A1 | 8/2008 |
| EP | 2033766 A1 | 3/2009 |
| JP | 61-256170 | 11/1986 |
| WO | 0030833 A1 | 6/2000 |
| WO | 2007104826 A1 | 9/2007 |

OTHER PUBLICATIONS

European search report for corresponding European application 09160101.3 lists the references above.

* cited by examiner

*Primary Examiner* — Khanh P Nguyen
*Assistant Examiner* — Carson Gross
(74) *Attorney, Agent, or Firm* — DLA Piper LLP (US)

(57) ABSTRACT

A filament winding apparatus includes a control unit, a rotation mechanism that rotates a mandrel, a hoop winding head that performs hoop-winding, and a helical winding head that performs helical-winding. The hoop winding head includes bobbins that feed fiber bundles to the mandrel and a circulation mechanism that circulates the bobbins around the mandrel. The control unit controls the rotation and circulation mechanisms such that the mandrel is rotated and the bobbins are circulated in the same direction during helical-winding. It is not necessary to cut fiber bundles after hoop-winding, and wasted fiber is not fed during helical-winding, thereby increasing economy and productivity.

5 Claims, 16 Drawing Sheets

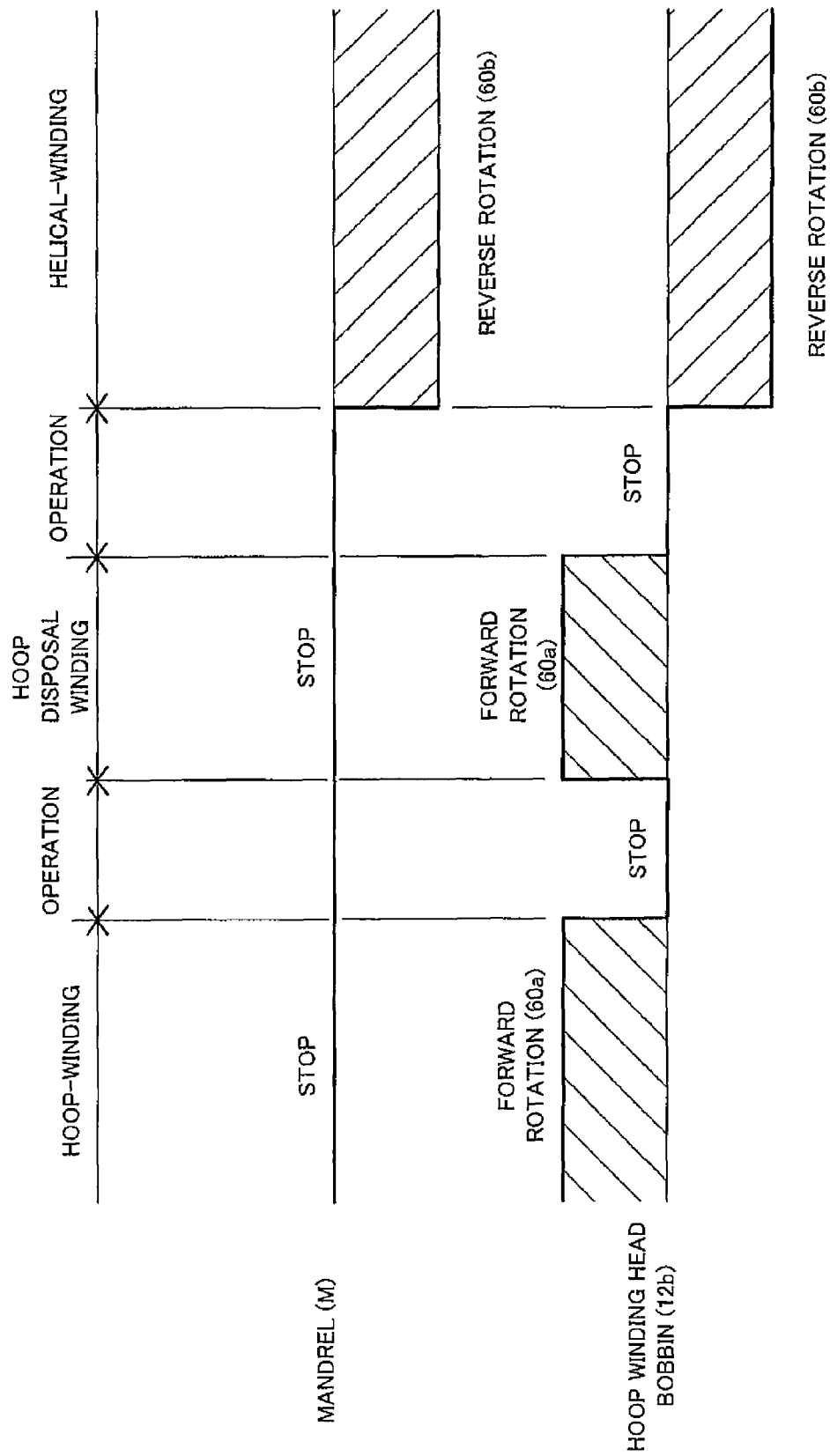

FILAMENT WINDING APPARATUS AND METHOD THEREOF

CROSS-REFERENCE TO RELATED APPLICATIONS

This application claims the benefit of priority under 35 USC 119 of Japanese application no. 2008-161521, filed on Jun. 20, 2008, which is incorporated herein by reference.

BACKGROUND OF THE INVENTION

1. Field of the Invention

The present invention relates to a filament winding apparatus and a method thereof that hoop-wind or helical-wind fiber bundles around a mandrel.

2. Description of the Related Art

A filament winding apparatus manufactures a hollow container such as a pressure tank, a pipe, and the like, through a filament winding method. The filament winding method manufactures products (such as pressure tanks) by winding fiber bundles around a mandrel (liner). The fiber bundle is composed of textile materials such as glass fiber or textile materials using synthetic resin, for example.

The filament winding apparatus winds the fiber bundles, which are fed from a head portion, around the mandrel. The head portion includes a hoop winding head that performs hoop-winding and a helical winding head that performs helical-winding. Hoop-winding winds the fiber bundles at a substantially right angle with respect to an axial direction of the mandrel (FIG. 7A). Helical-winding winds the fiber bundles at a predetermined angle with respect to the axial direction of the mandrel (FIGS. 7B and 7C).

A conventional filament winding apparatus fixes, to the mandrel, an end portion of the fiber bundle fed from the hoop winding head or the helical winding head, and then rotates the mandrel. By rotation of the mandrel, the fiber bundle is fed from each head and wound around the mandrel, and thus hoop-winding or helical-winding is performed. Therefore, in order not to feed a wasteful fiber bundle (wasted fiber) from the hoop winding head by rotation of the mandrel during helical-winding, the fiber bundle from the hoop winding head is cut by a cutter or the like to be separated from the mandrel after hoop-winding.

In another conventional filament winding apparatus, a fiber bundle is not cut by a cutter or the like after hoop winding, and during helical-winding, the hoop winding head is retreated from the mandrel, and the fiber bundle is fed from the hoop winding head and wound at the retreated position (disposal fiber).

SUMMARY OF THE INVENTION

In order to overcome the problems described above, the present invention provides a filament winding apparatus and a method thereof that do not need to cut a fiber bundle by a cutter or the like after hoop-winding and do not feed a wasteful fiber bundle (wasted fiber) during helical-winding, which thereby increases economy and productivity.

According to an embodiment of the present invention, a filament winding apparatus that hoop-winds and helical-winds fiber bundles around a mandrel includes: a control unit that controls the filament winding apparatus; a rotation mechanism that rotates the mandrel; a hoop winding head that performs hoop-winding; and a helical winding head that performs helical-winding. The hoop winding head includes bobbins that feed the fiber bundles to the mandrel and a circulation mechanism that circulates the bobbins around the mandrel. The control unit controls the rotation mechanism of the mandrel and the circulation mechanism of the bobbins so as to rotate and circulate in the same direction during helical winding.

According to an embodiment of the present invention, the filament winding apparatus further includes a mandrel transferring mechanism that transfers the mandrel and a hoop winding head transferring mechanism that transfers the hoop winding head. The control unit controls the mandrel transferring mechanism and the hoop winding head transferring mechanism such that the hoop winding head retreats from the mandrel by a predetermined distance during helical winding.

According to an embodiment of the present invention, in a filament winding method that hoop-winds and helical-winds fiber bundles around a mandrel, during hoop-winding, the mandrel is stopped, and bobbins having fiber bundles wound therearound (bundle-wound bobbins) circulate around the mandrel, and during helical-winding, the mandrel and the bobbins are rotated in the same direction.

According to an embodiment of the present invention, the filament winding apparatus and the method thereof (i) stop the mandrel and circulate the bundle-wound bobbins around the mandrel during hoop-winding, and (ii) rotate the mandrel and the bobbins in the same direction during helical-winding.

According to an embodiment of the present invention, the fiber bundles can be hoop-wound by circulating the bobbins around the stopped mandrel. Further, the fiber bundles can be helical-wound by rotating the mandrel. Furthermore, since the bobbins are circulated in the same direction as the mandrel rotation direction, the fiber bundles are not fed from the bobbins during helical-winding.

Therefore, the filament winding apparatus and the method thereof according to an embodiment of the present invention do not need to cut the fiber bundle by a cutter or the like after hoop-winding and do not feed a wasteful fiber bundle (wasted fiber), which thereby increase economy and productivity.

Other features, elements, processes, steps, characteristics and advantages of the present invention will become more apparent from the following detailed description of embodiments of the present invention with reference to the attached drawings.

BRIEF DESCRIPTION OF THE DRAWINGS

FIG. 16 is a timing chart illustrating the timing and a rotation direction of a bobbin circulation and a mandrel rotation of the hoop winding head.

DETAILED DESCRIPTION OF EMBODIMENTS OF THE INVENTION

A filament winding apparatus and a method thereof according to an embodiment of the present invention will now be described with reference to the drawings.

[Apparatus Structure]

Figure 1:
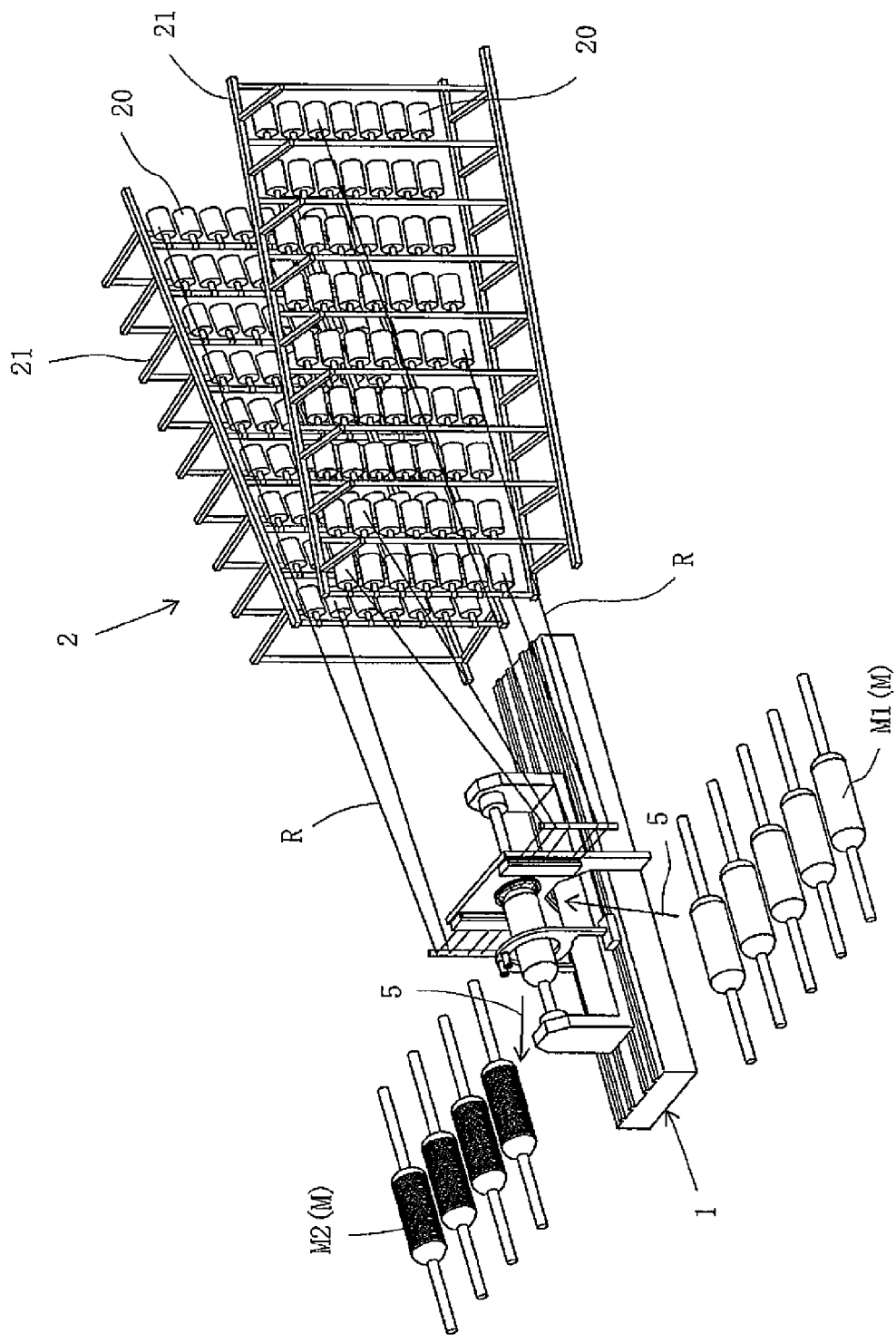
FIG. 1 is a partial perspective view of a filament winding apparatus according to an embodiment of the present invention.

FIG. 1 is a partial perspective view of a filament winding apparatus. The filament winding apparatus includes a winding device 1 and a supply unit 2.

The winding device 1 winds a fiber bundle R around a mandrel M. The supply unit 2 includes a plurality of bobbins 20 in each creel 21. The fiber bundle R is wound around each of the bobbins 20. The fiber bundle R is composed of textile materials such as glass fiber and textile materials using synthetic resin, for example. The supply unit 2 supplies the winding device 1 with the fiber bundle R fed from each of the bobbins 20.

The fiber bundle R is impregnated in advance with thermosetting synthetic resin. Alternatively, the fiber bundle R may not be impregnated with resin. In such a case, a resin impregnating device may be provided between the winding device 1 and the supply unit 2 to impregnate the fiber bundles R fed from the bobbins 20 with resin and then supply the winding device 1 with the resin-impregnated fiber bundles R.

A plurality of mandrels M (M1, M2) are aligned on each side (i.e., a front side and an inner side of FIG. 1) of the winding device 1. The unwound mandrels M1 (the mandrels having no fiber bundle R wound therearound) are aligned on the front side of the winding device 1, and the mandrels M2 having the fiber bundle R wound around by the winding device 1 are aligned on a rear side (the inner side of FIG. 1) of the winding device 1. The mandrels M1 and M2 are aligned on one side (on the left side of FIG. 1) of the winding device 1.

[Winding Device]

Figure 2:
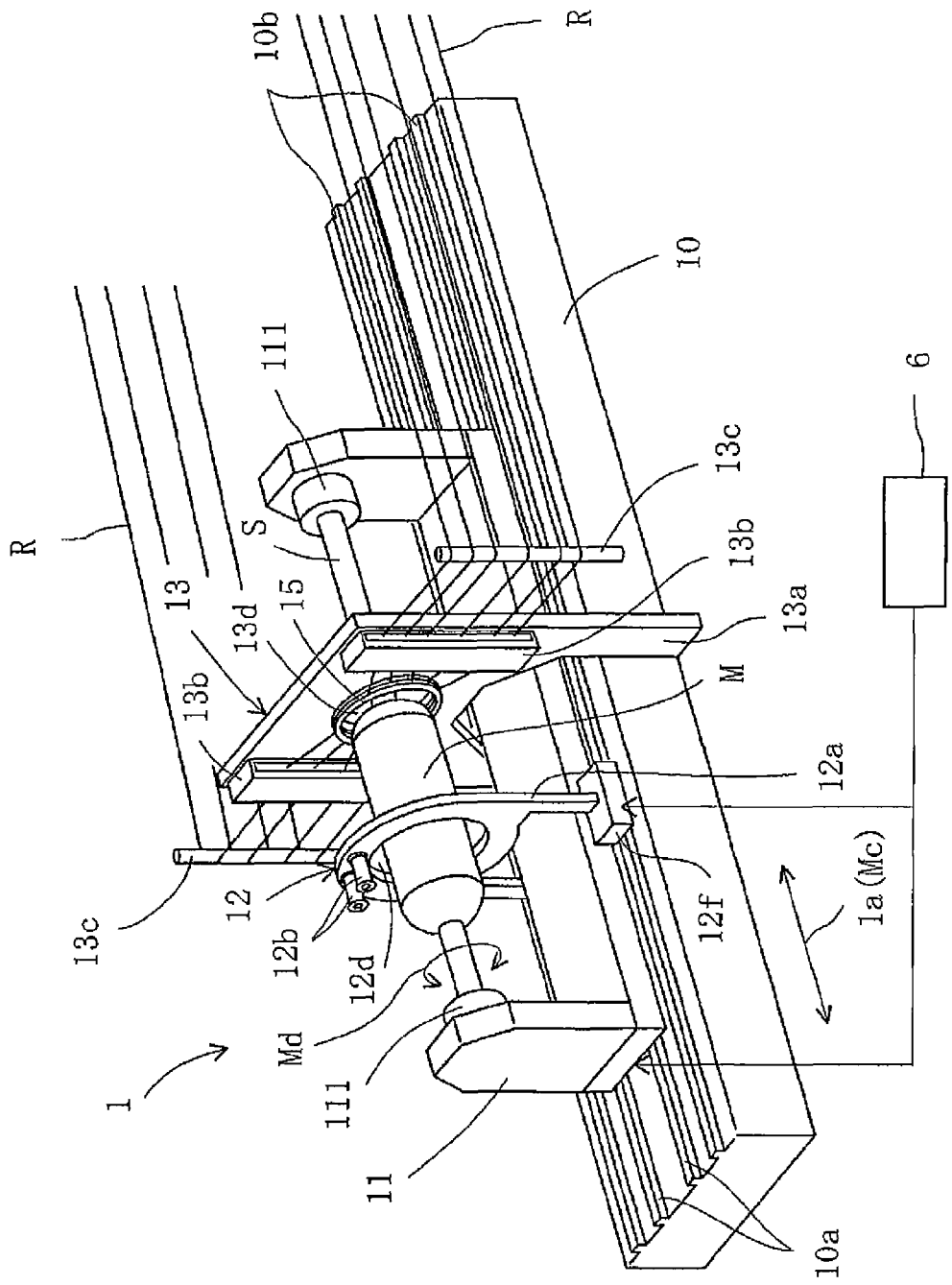
FIG. 2 is an enlarged perspective view of a winding device of FIG. 1 according to an embodiment of the present invention.

FIG. 2 is an enlarged perspective view of the winding device 1 of FIG. 1. The winding device 1 includes a machine frame 10. The machine frame 10 includes a pair of parallel first guide rails 10a that extend in a longitudinal direction 1a. The winding device 1 further includes a mandrel transferring frame 11. The mandrel transferring frame 11 can reciprocate in the longitudinal direction 1a along the first guide rails 10a.

The mandrel M includes a mandrel spindle S that extends in a mandrel axial direction Mc. The mandrel transferring frame 11 rotationally holds the spindle S by rotation mechanisms 111 provided on both sides of the mandrel transferring frame 11. The rotation mechanisms 111 rotate the mandrel M along with the spindle S around a central axis.

When producing a pressure tank, the mandrel M may be made of high-strength aluminum, metal, or resin, for example, and has a cylindrical portion Ma and dome portions Mb provided on both sides of the cylindrical portion Ma (FIG. 7). The spindle S is removably fixed to the mandrel M. The longitudinal direction 1a of the machine frame 10 corresponds to the mandrel axial direction Mc. The material and the shape of the mandrel M may be changed in accordance with a product to be produced.

The winding device 1 includes a hoop winding head 12 and a helical winding head 13. The hoop winding head 12 hoop-winds the fiber bundle R around the mandrel M. The helical winding head 13 helical-winds the fiber bundle R around the mandrel M.

The drive of the winding device 1 is controlled by a control unit 6. The control unit 6 controls the reciprocating movement of the mandrel transferring frame 11, the rotation of the mandrel M, the reciprocating movement of the hoop winding head 12, and the circulation of a bobbin 12b, for example. The control unit 6 also controls the drive of side wall portions 11b of the mandrel transferring frame 11, which will be described later.

The hoop winding head 12 includes a body frame 12a. The body frame 12a includes a penetration portion 12d opened at its center. The mandrel M is penetrated through the penetration portion 12d.

The machine frame 10 includes a pair of parallel second guide rails 10b that extend in the longitudinal direction 1a. The hoop winding head 12 includes a transfer base 12f and reciprocates in the longitudinal direction 1a along the second guide rails 10b. Thus, the hoop winding head 12 reciprocates with the mandrel M penetrated through the penetration portion 12d.

The hoop winding head 12 includes a plurality of bobbins 12b (for example, two to four bobbins 12b) each having the fiber bundle R wound around and housed therein. As described later, the hoop winding head 12 also includes a circulation mechanism 120 (FIG. 5) that circulates the bobbin 12b in a mandrel circumferential direction Md. The fiber bundle R fed from the circulating bobbin 12b is wound around the mandrel M.

The helical winding head 13 includes a body frame 13a. The body frame 13a includes a penetration portion 13d opened at its center. The mandrel M is penetrated through the penetration portion 13d. The helical winding head 13 is fixed to a central portion of the longitudinal direction 1a of the machine frame 10.

The mandrel transferring frame 11 reciprocates in the state in which the mandrel M is penetrated through the penetration portion 13d. Thus, the helical winding head 13 reciprocates in the longitudinal direction 1a relative to the mandrel M.

The helical winding head 13 winds the fiber bundle R fed from the supply unit 2 around the mandrel M. The helical winding head 13 includes a ring-like guide ring portion 15 that extends along the mandrel circumferential direction Md. The body frame 13a includes tension portions 13b on both sides of the guide ring portion 15. The helical winding head 13 further includes guide rollers 13c on both sides of the body frame 13a.

The helical winding head 13 guides, by the guide rollers 13c, the fiber bundles R fed from the bobbins 20 and introduces the guided fiber bundles R to the tension portions 13b. The tension portions 13b apply predetermined resin and tension to the fiber bundles R. By applying predetermined tension to the fiber bundles R through the tension portions 13b, the fiber bundles R can be firmly wound around the mandrel M.

[Helical Winding Head]

Figure 3:
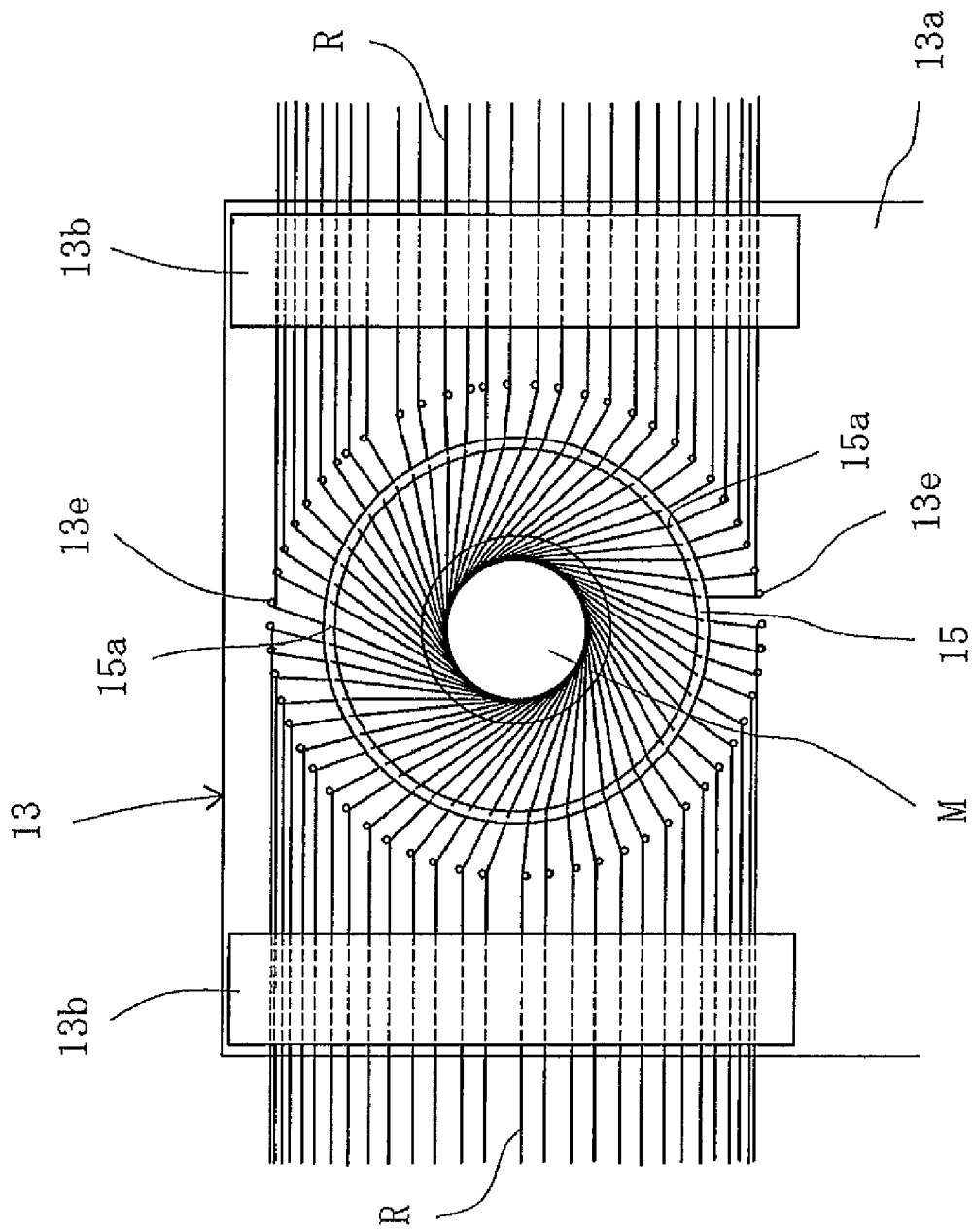
FIG. 3 is an elevation view of a helical winding head according to an embodiment of the present invention.

FIG. 3 is an elevation view of the helical winding head 13. The helical winding head 13 includes a plurality of ring-like auxiliary guides 13e. The auxiliary guides 13e are aligned along an external side of the guide ring portion 15.

The fiber bundles R fed from the bobbins 20 are supplied from both sides of the helical winding head 13 to the tension portions 13b via the guide rollers 13c. The fiber bundles R are guided from the tension portions 13b through the auxiliary guides 13e to the guide ring portion 15. The fiber bundles R are further guided to the mandrel M via a plurality of guide holes 15a provided along the guide ring portion 15.

[Open Fiber Guide]

Figure 4:
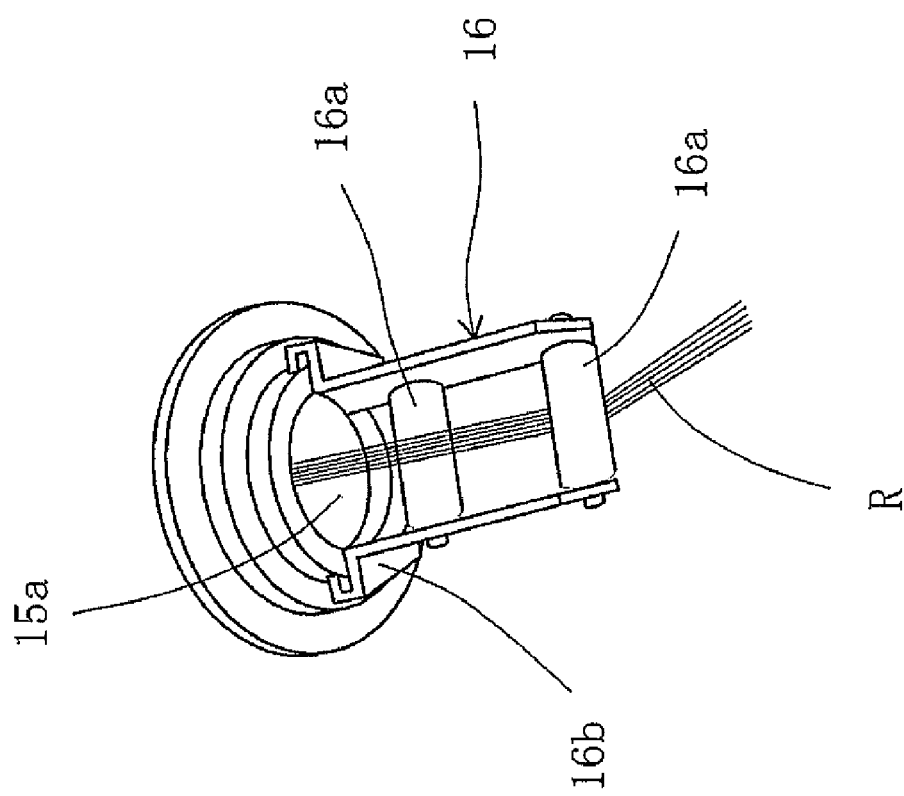
FIG. 4 is a perspective view of an open fiber guide according to an embodiment of the present invention.

FIG. 4 is a perspective view of an open fiber guide 16. Each guide hole 15a has the open fiber guide 16 inside the guide ring portion 15 of the helical winding head 13. The open fiber guide 16 includes a pair of rotative open fiber rollers 16a.

The open fiber rollers 16a are arranged parallel to a plane including a radial direction of the guide hole 15a. The open fiber guide 16 includes a rotation base 16b that can rotate around the center of the guide hole 15a. The rotation base 16b supports the open fiber rollers 1a.

The fiber bundle R is penetrated between the pair of open fiber rollers 16a. Thus, the open fiber guide 16 freely rotates even when a winding angle θ of the fiber bundle R changes with respect to the mandrel M, and thus the fiber bundle R can be kept in an open state (i.e., the fiber bundle R is increased in width) by the open fiber rollers 16a and is wound around the mandrel M.

[Hoop Winding Head Etc.]

Figure 5:
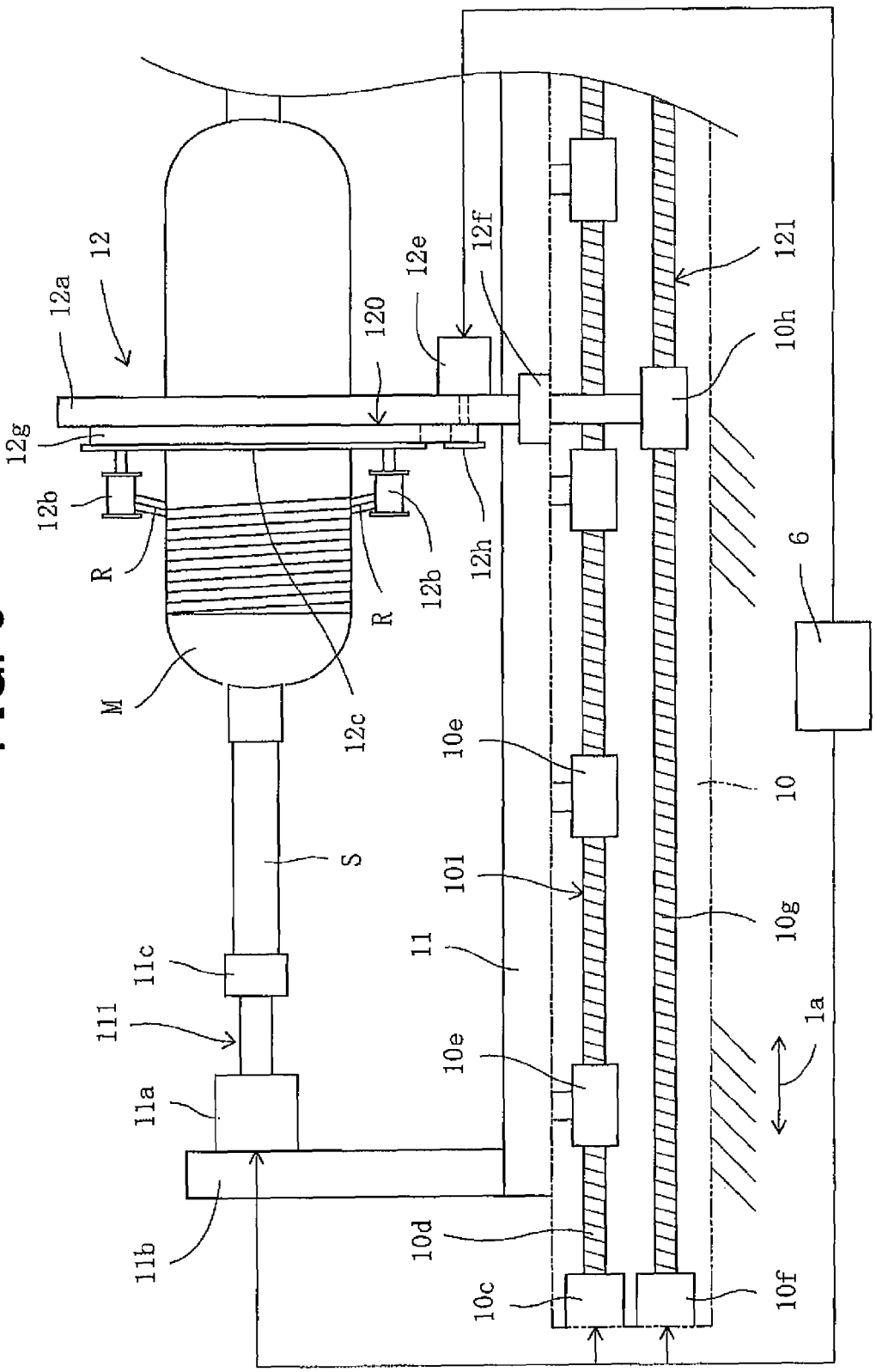
FIG. 5 is a partial side view of the winding device.
Figure 6A:
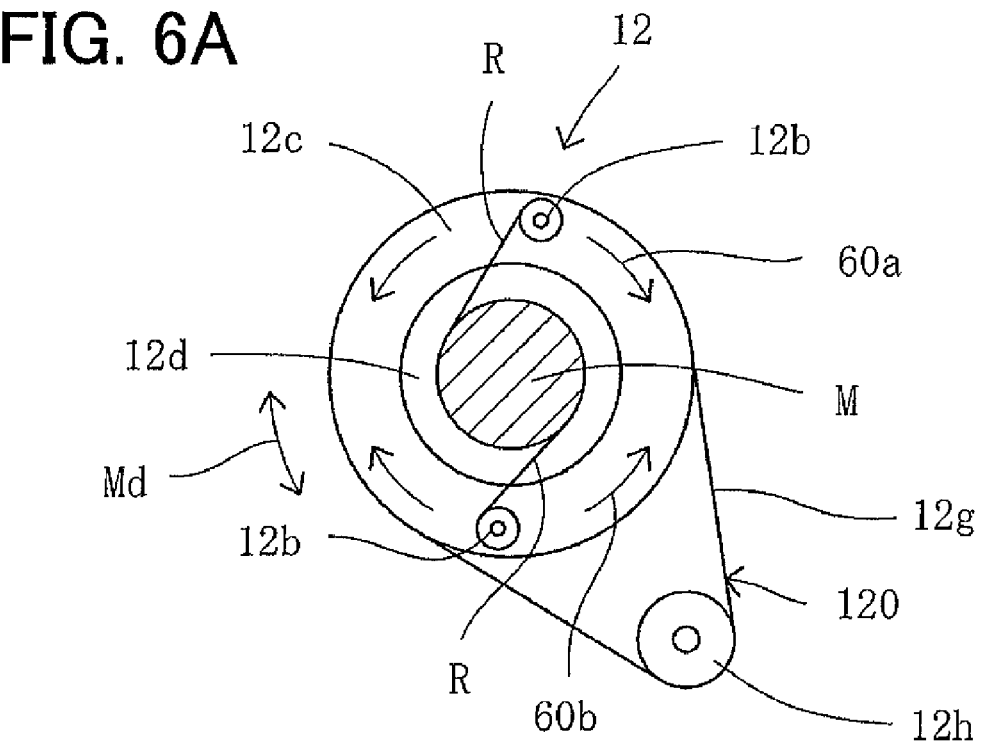
FIG. 6A is a partial elevation view of a hoop winding head viewed from an axial direction of a mandrel.
Figure 6B:
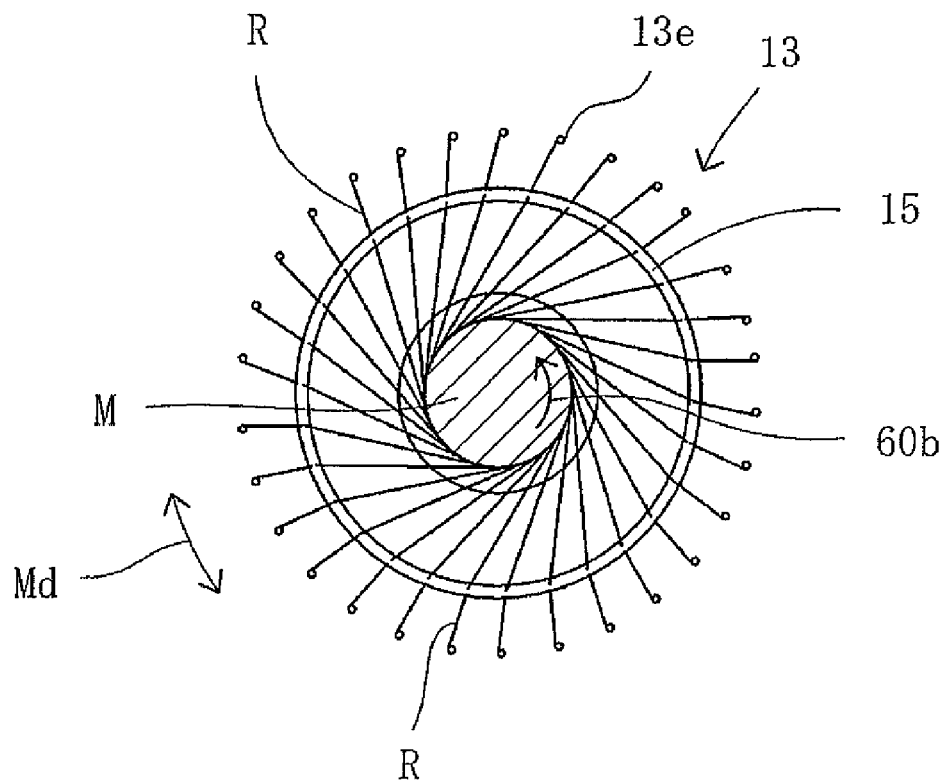
FIG. 6B is a partial elevation view of a helical winding head from an axial direction of a mandrel, according to an embodiment of the present invention.

FIG. 5 is a partial side view of the winding device 1. FIG. 6A is a partial elevation view of the hoop winding head, FIG. 6B is a partial elevation view of the helical winding head, both viewed from the mandrel axial direction.

[Circulation Mechanism]

As illustrated in FIGS. 5 and 6A, the hoop winding head 12 includes the circulation mechanism 120 that circulates the bobbins 12b around the mandrel M. The circulation mechanism 120 includes a rotation disk 12c. The rotation disk 12c is supported such that the disk 12c can rotate with respect to the body frame 12a. Similarly to the body frame 12a, the rotation disk 12c includes the penetration portion 12d through which the mandrel M is penetrated. The rotation disk 12c rotates around the mandrel M.

The bobbin 12b is rotationally supported by the rotation disk 12c. The circulation mechanism 120 includes a bobbin rotation drive unit 12e having a motor and the like. The circulation mechanism 120 includes a pulley 12h, which is connected to a rotational axis of the bobbin rotation drive unit 12e. The rotation disk 12c and the pulley 12h are connected with each other via an endless belt 12g.

The hoop winding head 12 drives the bobbin rotation drive unit 12e to rotate the pulley 12h, and the rotation disk 12c via the endless belt 12g. Thus, the bobbin 12b rotates around the mandrel M while rotating around its axis to feed and wind the fiber bundle R around the mandrel M.

The bobbin circulation mechanism 120 is not limited to the above mechanism using the belt, and may adopt a mechanism using a gear, or the like.

[Rotation Mechanism]

As illustrated in FIG. 5, the mandrel transferring frame 11 includes the rotation mechanisms 111 that rotate the mandrel M around the central axis. The rotation mechanism 111 includes a mandrel rotation drive unit 11a composed of a motor etc. The mandrel rotation drive unit 11a includes a chuck portion 11c arranged at an end portion of a rotational axis of the mandrel rotation drive unit 11a. The chuck portion 11c allows rotation of the mandrel spindle S through spline connection or the like and can be removed from the spindle S.

The rotation mechanism 111 drives the mandrel rotation drive unit 11a to rotate the mandrel M around the central axis via the mandrel spindle S connected with the chuck portion 11c.

[Transferring Mechanism]

In FIG. 5, the machine frame 10 is illustrated in two-dot chain line, and its internal configuration is illustrated in full line. The machine frame 10 includes a mandrel transferring mechanism 101 that reciprocates the mandrel M in the longitudinal direction 1a and a hoop winding head transferring mechanism 121 that reciprocates the hoop winding head 12 in the longitudinal direction 1a.

The mandrel transferring mechanism 101 includes a mandrel transfer drive unit 10c composed of a motor etc. The mandrel transferring mechanism 101 also includes a mandrel ball screw shaft 10d that extends in the longitudinal direction 1a. The mandrel ball screw shaft 10d is connected with the mandrel transfer drive unit 10c and rotated by the drive of the mandrel transfer drive unit 10c.

The mandrel transferring mechanism 101 includes a mandrel ball nut 10e that is screwed together with the mandrel ball screw shaft 10d. The mandrel ball nut 10e is connected with the mandrel transferring frame 11.

Accordingly, the mandrel ball screw shaft 10d rotates forwardly and reversely, and thus the mandrel ball nut 10e reciprocates along the ball screw shaft 10d (i.e., in the longitudinal direction 1a). The mandrel transferring frame 11 connected with the mandrel ball nut 10e reciprocates along the first guide rails 10 (i.e., in the longitudinal direction 1a) (FIG. 2).

The hoop winding head transferring mechanism 121 includes a hoop winding head transfer drive unit 10f composed of a motor etc. The hoop winding head transferring mechanism 121 also includes a hoop winding head ball screw shaft 10g that extends in the longitudinal direction 1a. The hoop winding head ball screw shaft 10g is connected with the hoop winding head transfer drive unit 10f and rotated by the drive of the hoop winding head transfer drive unit 10f.

The hoop winding head transferring mechanism 121 includes a hoop winding head ball nut 10h that is screwed together with the hoop winding head ball screw shaft 10g. The hoop winding head ball nut 10h is connected with the transfer base 12f of the hoop winding head 12.

Accordingly, the hoop winding head ball screw shaft 10g rotates forwardly and reversely, and thus the hoop winding head ball nut 10h reciprocates along the ball screw shaft 10g (i.e., in the longitudinal direction 1a). The hoop winding head 12 (the transfer base 12f) connected with the hoop winding head ball nut 10h reciprocates along the second guide rails 10b (in the longitudinal direction 1a) (FIG. 2).

The mandrel transferring mechanism 101 and the hoop winding head transferring mechanism 121 are not limited to a mechanism using the above ball screw system, and may adopt a mechanism using an actuator system, for example.

[Control Unit]

The control unit 6 is connected with the bobbin rotation drive unit 12e, the mandrel rotation drive unit 11a, the mandrel transfer drive unit 10c, and the hoop winding head transfer drive unit 10f. Thus, the control unit 6 controls the circulation mechanism 120, the rotation mechanism 111, the mandrel transferring mechanism 101, and the hoop winding head transferring mechanism 121 based on drive data, which is set in advance or is input.

[Hoop-Winding/Helical-Winding]

As illustrated in FIG. 6A, when performing hoop-winding, the bobbin 12b circulates around the mandrel M in a forward direction 60a (clockwise rotation). During hoop-winding, the mandrel M stops rotating.

As illustrated in FIG. 6B, when performing helical-winding, the mandrel M rotates around the mandrel central axis in a reverse direction 60b (counterclockwise rotation). During helical-winding, the bobbin 12 circulates around the mandrel M in the reverse direction 60b (counterclockwise rotation) (FIG. 6A) as described later.

Figure 7A:
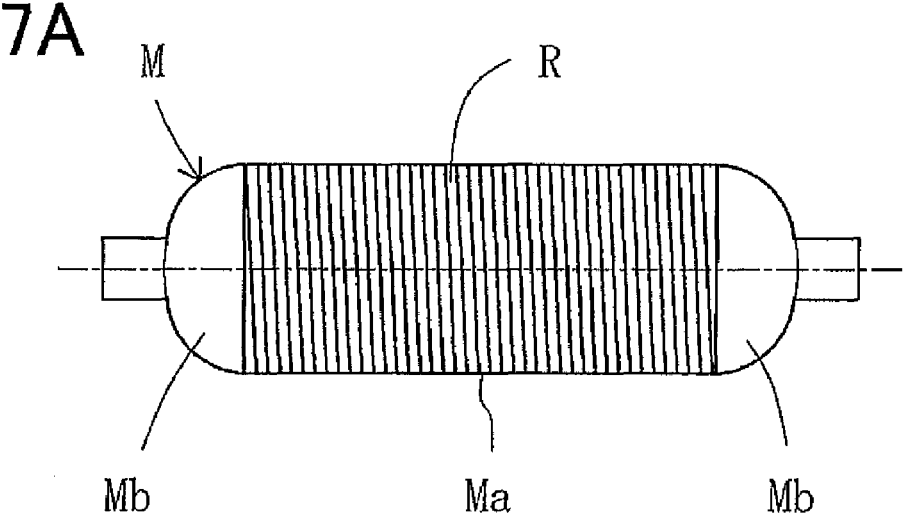
FIGS. 7A, 7B, and 7C are side views of hoop-winding and helical-winding.
Figure 7B:
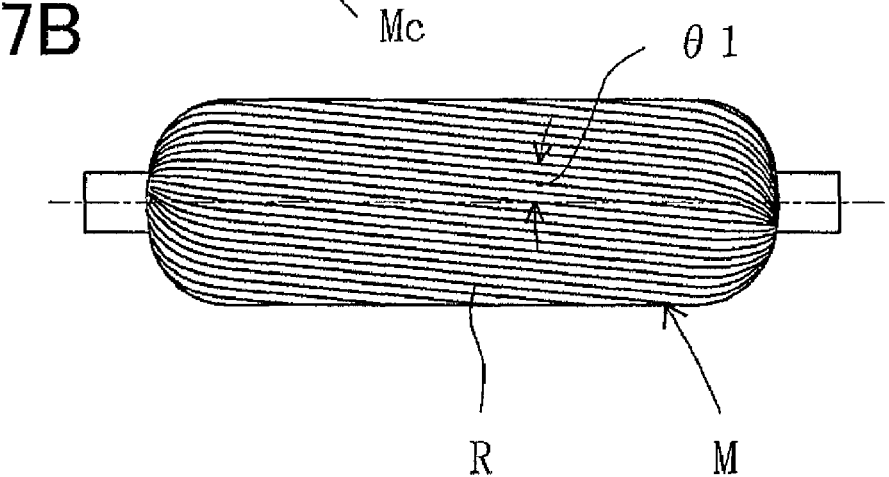
Figure 7C:
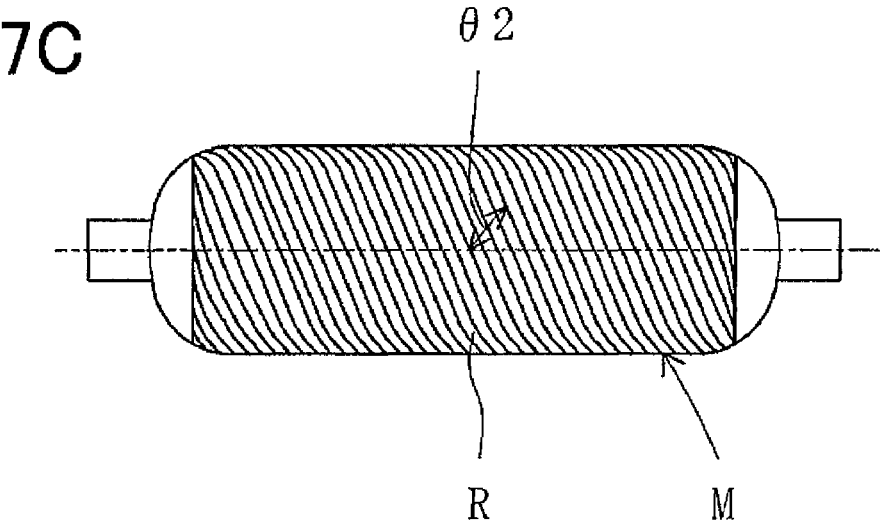

FIGS. 7A, 7B and 7C are side views illustrating hoop-winding and helical-winding. As illustrated in FIG. 7A, hoop-winding winds the fiber bundle R at a substantially right angle with respect to the mandrel axial direction Mc. As illustrated in FIGS. 7B and 7C, helical-winding winds the fiber bundle R at a predetermined angle θ (θ1, θ2) with respect to the mandrel axial direction Mc. As described above, the hoop winding head 12 performs hoop-winding, and the helical winding head 13 performs helical-winding.

[Manufacturing Process]

FIGS. 8-15 are side views illustrating manufacturing processes of the filament winding apparatus.

[Setting Operation]

Figure 8A:
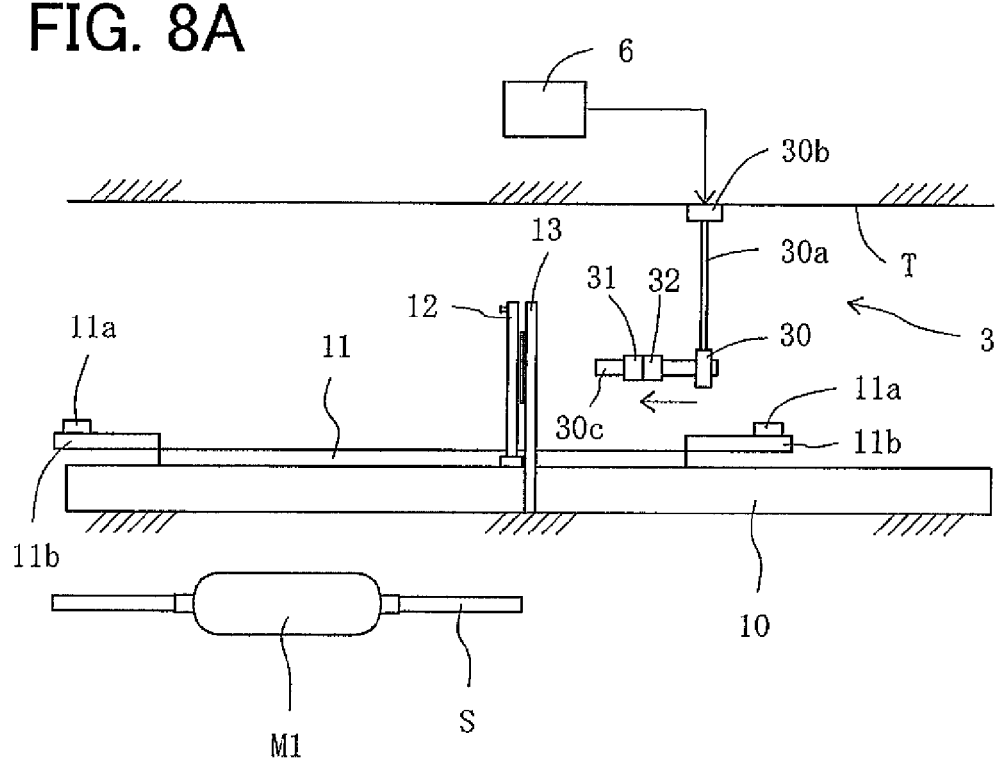
FIGS. 8A and 8B are side views illustrating a manufacturing process of the filament winding apparatus.

As illustrated in FIG. 8A, the filament winding apparatus includes a delivery unit 3. The delivery unit 3 includes a delivery hand portion 30 that removably grips and holds a delivery spindle 30c. The delivery hand portion 30 includes a telescopic arm 30a that can expand and contract in a perpendicular direction.

Further, the delivery hand portion 30 includes a transfer base 30b that can move in a horizontal direction along a guide rail provided on a ceiling portion T. The delivery hand portion 30 is drive-controlled by the control unit 6.

The delivery spindle 30c holds a first delivery ring 31 and a second delivery ring 32. Through spline connection or the like, each of the delivery rings 31 and 32 can move in an axial direction with respect to the delivery spindle 30c, and is restricted in a circumferential direction.

The delivery rings 31 and 32 are connected with each other via a removal mechanism using magnetic force etc. of a permanent magnet and are positionally fixed to the delivery spindle 30c. The delivery rings 31 and 32 are separated from one another and from the delivery spindle 30c in a below-described process.

The mandrel transferring frame 11 includes the mandrel rotation drive units 11a each arranged on the corresponding side wall portion 11b. Each of the side wall portions 11b stands in a perpendicular direction at the time of a winding operation, and can be folded (tilted) towards a horizontal direction at the time of setting/discharging the mandrel M.

The mandrel transferring frame 11 waits in the state in which both side wall portions 11b are folded. While gripping and holding the delivery spindle 30c, the delivery hand portion 30 moves from an end side (on the right of FIG. 8A) to another end side (on the left of FIG. 8A) of the machine frame 10.

Figure 8B:
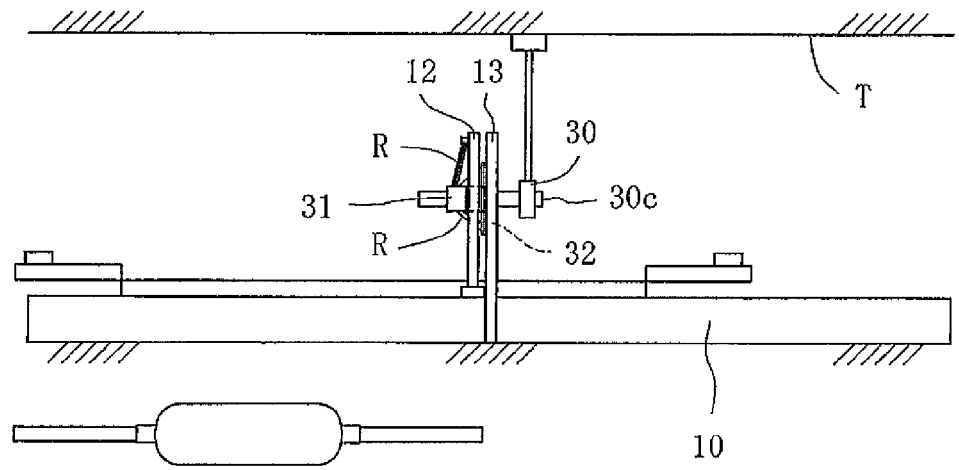

As illustrated in FIG. 8B, the delivery hand portion 30 positions the delivery spindle 30c in the state in which the delivery spindle 30c is penetrated through the penetration portion 12d of the hoop winding head 12 and the penetration portion 13d of the helical winding head 13.

Each of the delivery rings 31 and 32 is positionally fixed by chuck mechanisms provided to the hoop winding head 12 and the helical winding head 13. A leading edge of the fiber bundle R fed from the hoop winding head 12 and the helical winding head 13 is fixed to the first delivery ring 31 by tape, or the like.

Figure 9A:
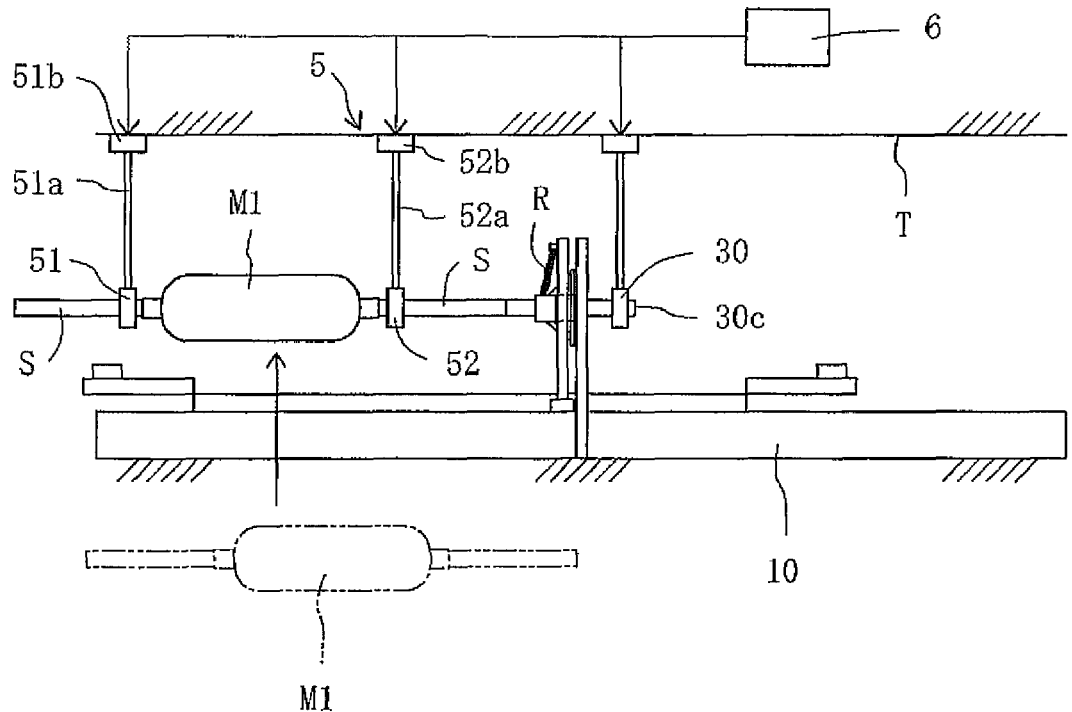
FIGS. 9A and 9B are side views following FIGS. 8A and 8B.

As illustrated in FIG. 9A, the filament winding apparatus includes a setting/discharging device 5. The setting/discharging device 5 includes a first setting/discharging hand portion 51 and a second setting/discharging hand portion 52. The first and second setting/discharging hand portions 51, 52 removably grip the mandrel spindle S, support and move the mandrel M1 before the winding operation and the mandrel M2 after the winding operation.

Similarly to the delivery hand portion 30, the first and second setting/discharging hand portions 51, 52 include telescopic arms 51a/52a and transferring bases 51b, 52b, respectively. The first and second setting/discharging hand portions 51, 52 are drive-controlled by the control unit 6.

The first and second setting/discharging hand portions 51, 52 grip the spindle S on both sides of the mandrel M1 before the winding operation and move the spindle S. The first and second setting/discharging hand portions 51, 52 arrange the mandrel spindle S such that one end (on the right of FIG. 9A) of the mandrel spindle S makes contact with one end (on the left of FIG. 9A) of the delivery spindle 30c.

Figure 9B:
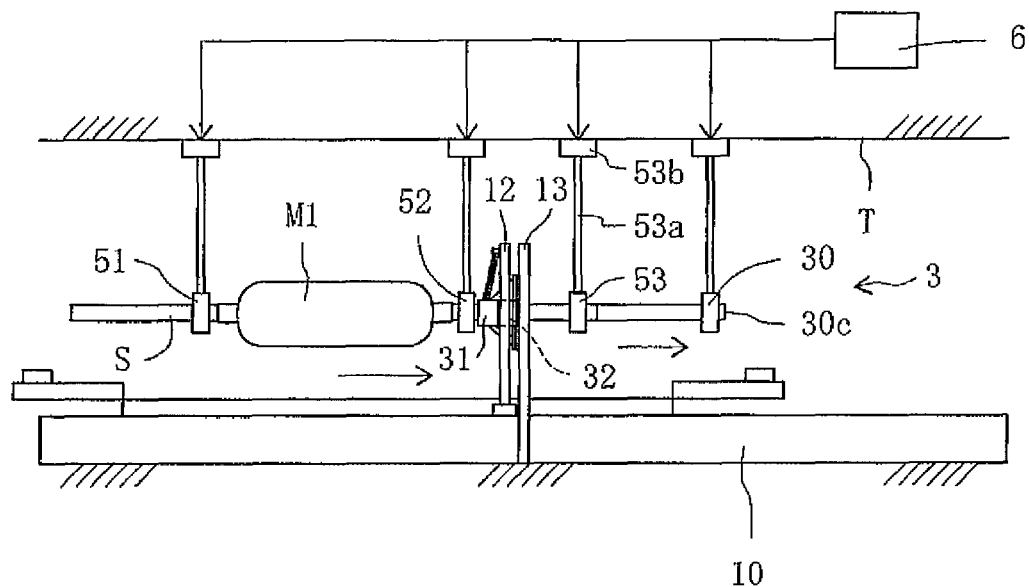

As illustrated in FIG. 9B, the first and second setting/discharging hand portions 51, 52 transfer the mandrel M1 to the end side (on the right of FIG. 9B) of the machine frame 10. Synchronized therewith, the delivery hand portion 30 moves the delivery spindle 30c to the end side (on the right of FIG. 9B) of the machine frame 10. Thus, the spindles S and 30c stay in contact with one another.

As described above, since the delivery rings 31, 32 are positionally fixed by the chuck mechanisms of the hoop winding head 12 and the helical winding head 13, the rings 31, 32 are fitted (delivered) from the delivery spindle 30c to the mandrel spindle S and held.

The bonding force of the chuck mechanisms is stronger than that of the removal mechanism, which positionally fixes the delivery rings 31, 32 to the delivery spindle 30c, and therefore, the delivery rings 31, 32 are removed from the delivery spindle 30c.

The setting/discharging device 5 includes a third setting/discharging hand portion 53. The third setting/discharging hand portion 53 has a configuration similar to that of the first setting/discharging hand portion 51 or the like, and includes a telescopic arm 53a and a transfer base 53b. The third setting/discharging hand portion 53 is drive-controlled by the control unit 6.

The third setting/discharging hand portion 53 holds the mandrel spindle S at the end side (on the right of FIG. 9B). Thus, the second and third setting/discharging hand portions 52, 53 hold the mandrel spindle S on both sides of the hoop winding head 12 and the helical winding head 13.

Figure 10A:
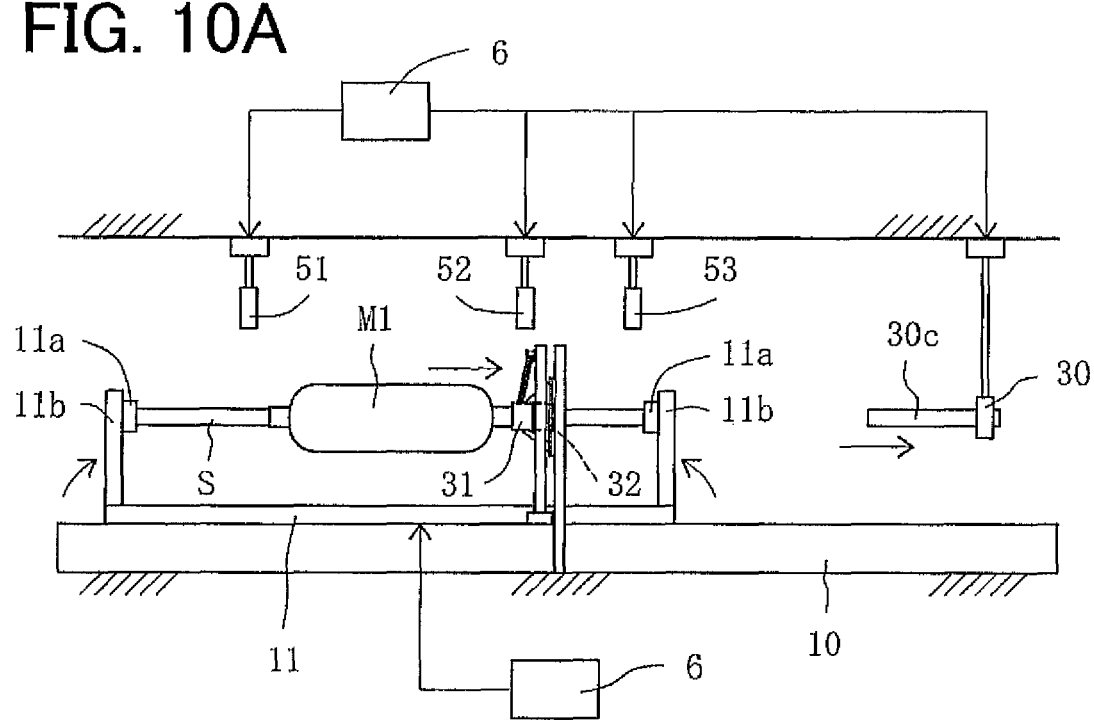
FIGS. 10A and 10B are side views following FIGS. 9A and 9B.

As illustrated in FIG. 10A, the delivery hand portion 30 retreats the delivery spindle 30c. The second setting/discharging hand portion 52 ungrips the mandrel spindle S and retreats upward by using the telescopic arm 52a.

The first and third setting/discharging hand portions 51, 53 transfer the mandrel M1 slightly towards the end side (on the right of FIG. 10A) of the machine frame 10. Thus, the delivery ring 31 makes contact with the mandrel M1.

Then, the side wall portions 11b of the mandrel transferring frame 11 stand. Both ends of the mandrel spindle S are connected with and supported by the mandrel rotation drive units 11a. The mandrel transferring frame 11 rotationally supports the mandrel M1.

Thus, the mandrel M1 before the winding operation is set (positioned) at a winding position. The first and third setting/ discharging hand portions 51, 53 ungrip the mandrel spindle S and retreat upward by using the telescopic arms 51a, 53a, respectively.

[Winding Operation]

Figure 10B:
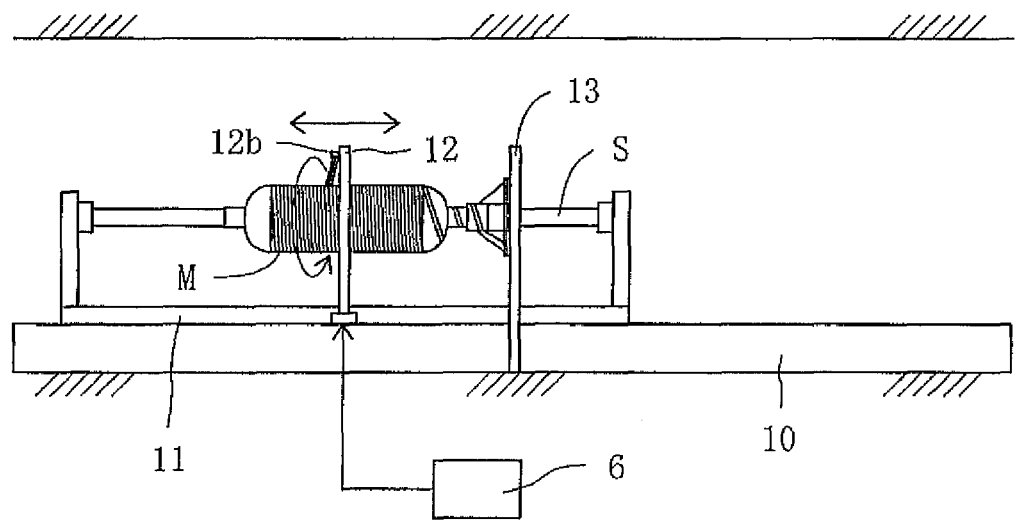

As illustrated in FIG. 10B, when performing hoop-winding, the hoop winding head 12 is operated by the control unit 6 as follows. While the hoop winding head 12 moves from an end side (on the right of FIG. 10B) to another side (on the left of FIG. 10B) of the mandrel M, the bobbins 12b circulate. Since the mandrel transferring frame 11 stays still, the mandrel M neither moves nor rotates.

Thus, the fiber bundle R is fed from each bobbin 12b. The fiber bundles R are wound at a substantially right angle (slightly slanted) with respect to the mandrel axial direction Mc (FIG. 7A) in such a manner that each fiber bundle R does not overlap with one another and is closely wound in parallel with one another. The movement speed of the hoop winding head 12 and the circulation speed of the bobbins 12b are determined so as to achieve the above winding.

By moving the hoop winding head 12 from the end side (on the right of FIG. 10B) to the other end side (on the left of the drawing) of the mandrel cylindrical portion Ma (FIG. 7A), single-layered fiber bundles R are wound around the mandrel cylindrical portion Ma. The hoop winding head 12 reciprocates between the end side and the other end side of the mandrel cylindrical portion Ma until the necessary number of layers of fiber bundles R is wound around.

Figure 11A:
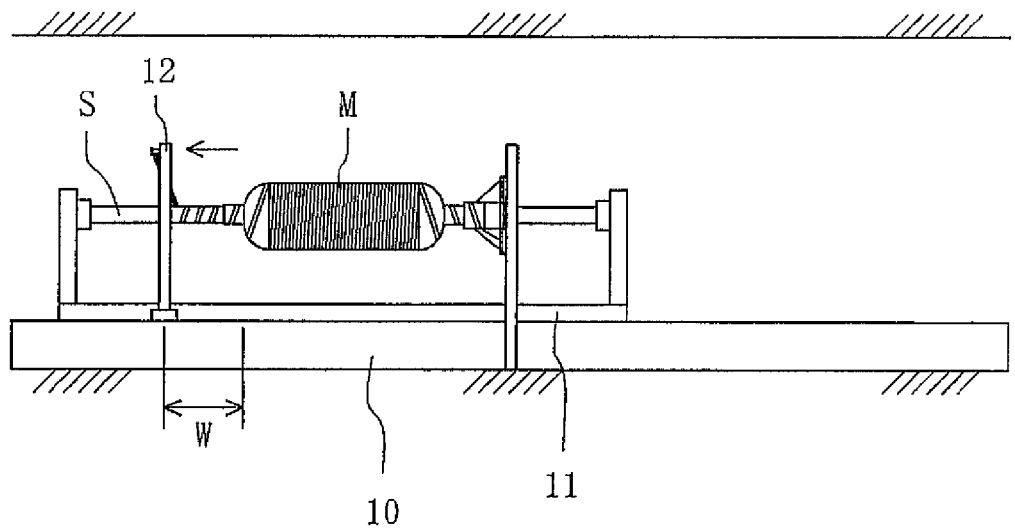
FIGS. 11a and 11B are side views following FIGS. 10A and 10B.

When hoop-winding is completed, the hoop winding head 12 retreats to the end side (on the left of FIG. 11A) of the mandrel transferring frame 11 as illustrated in FIG. 11A. The hoop winding head 12 is placed on the mandrel spindle S away from the mandrel M by a predetermined distance W.

Figure 11B:
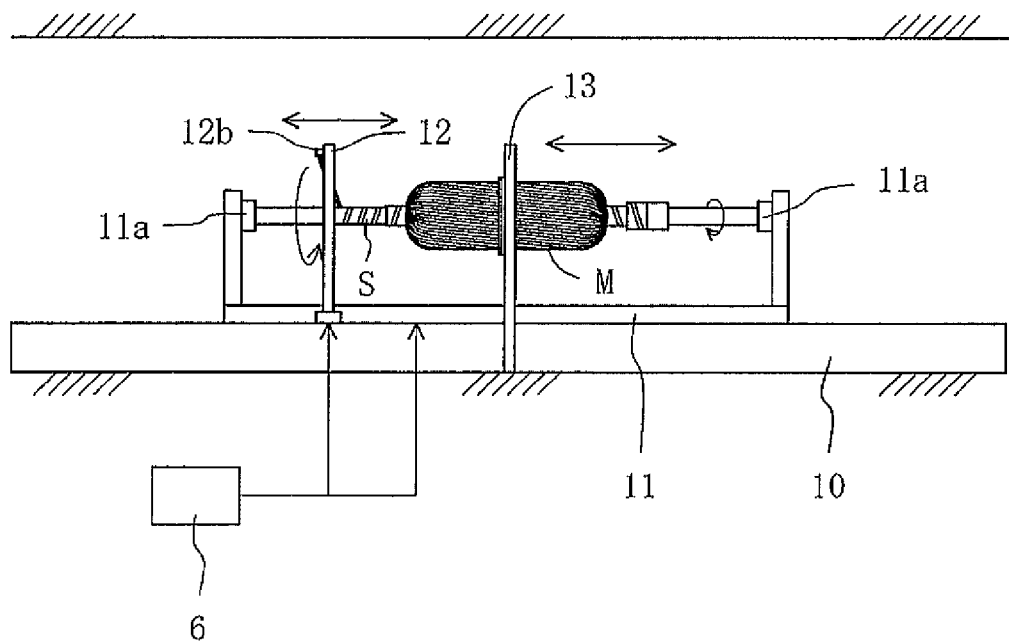

As illustrated in FIG. 11B, when performing helical-winding, the mandrel transferring frame 11 is operated by the control unit 6 as follows. The mandrel transferring frame 11 moves such that the helical winding head 13 relatively moves from the end side (on the right of FIG. 11B) to the other end side (on the left side of FIG. 11B) of the mandrel M. Accompanying this movement, the mandrel rotation drive units 11a rotate the mandrel M.

A plurality of fiber bundles R fed from the helical winding head 13 is wound at a mandrel parallel portion at the winding angle θ1 with respect to the mandrel axial direction Mc (FIG. 7B) in such a manner that each fiber bundle R does not overlap with one another and is closely wound in parallel with one another. The movement speed of the mandrel transferring frame 11 (the helical winding head 13) and the rotation speed of the mandrel rotation drive units 11a (mandrel M) are determined so as to achieve the above winding.

By moving the helical winding head 13 from the end side (on the right of FIG. 11B) to the other end side (on the left side of FIG. 11B) of the mandrel M, single-layered fiber bundles R are wound around the mandrel M. The helical winding head 13 reciprocates relatively between the end side to the other end side of the mandrel M until the necessary number of layers of fiber bundles R is wound around.

Further, the hoop winding head 12 moves in synchronicity with the mandrel transferring frame 11 to maintain the predetermined distance W from the mandrel M. The bobbins 12b rotate in the same direction as the rotation direction of mandrel M in synchronicity with rotation of the mandrel M so that extra fiber bundles R will not be fed from the bobbins 12b and wound around the spindle S.

Figure 12A:
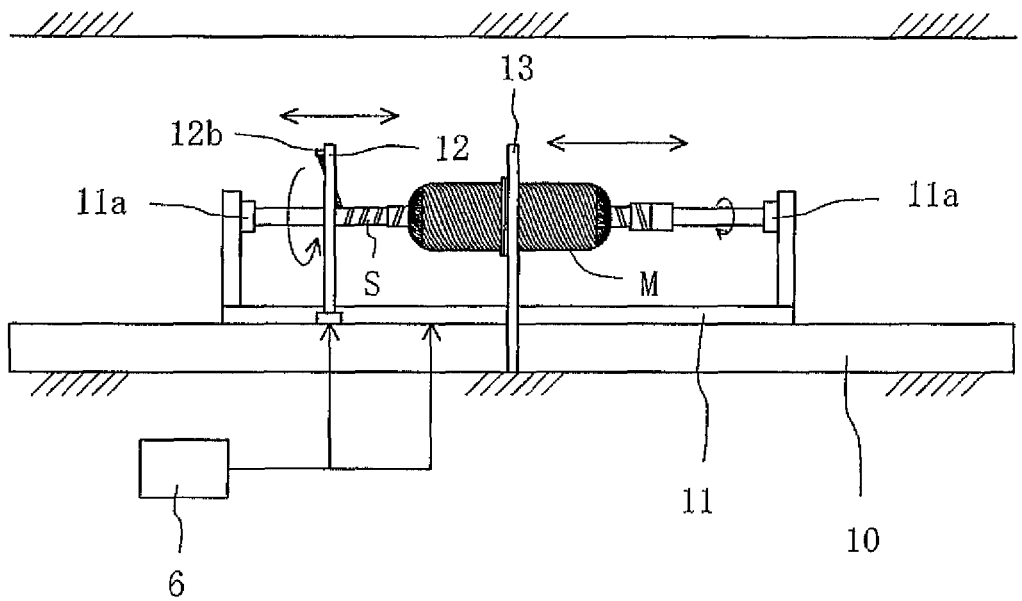
FIGS. 12A and 12B are side views following FIGS. 11A and 11B.
Figure 12B:
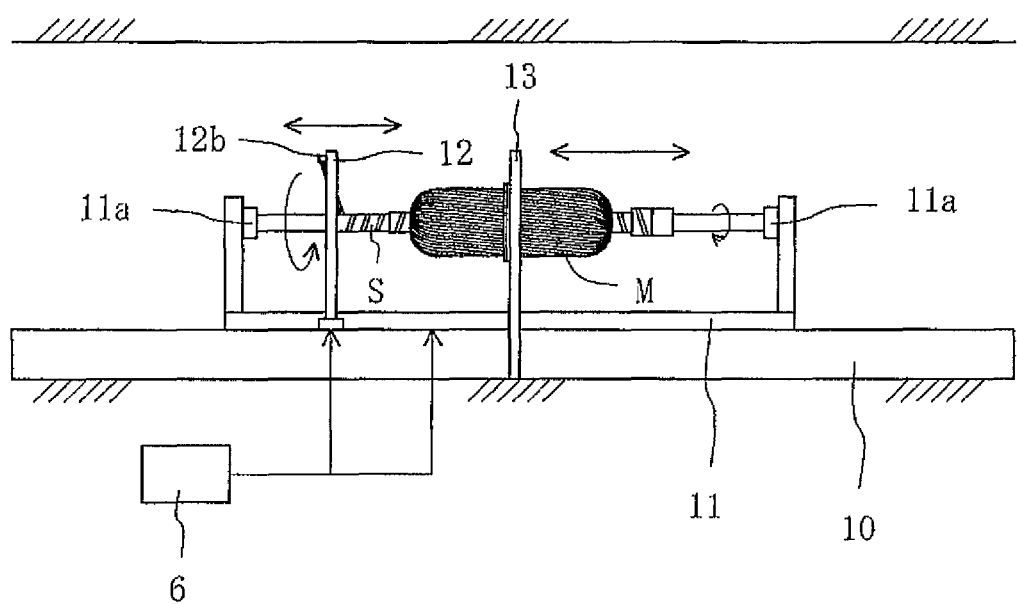

When performing helical-winding with the winding angle θ2 (θ2>θ1) as illustrated in FIG. 12A, and when performing helical-winding again with the winding angle θ1 thereafter as illustrated in FIG. 12B, the mandrel transferring frame 11 and the hoop winding head 12 are operated similarly to the above.

Figure 13A:
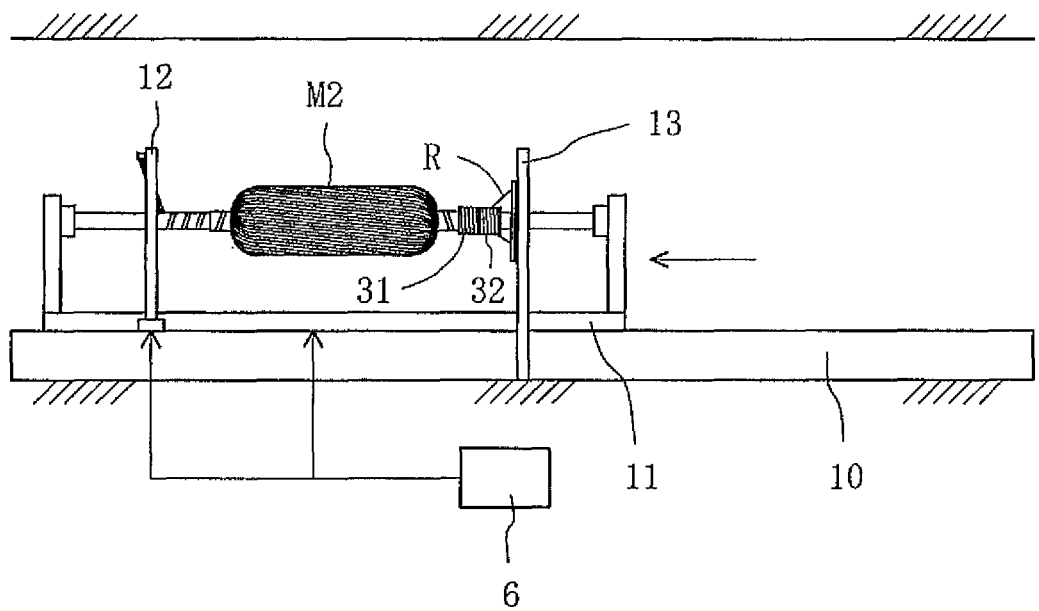
FIGS. 13A and 13b are side views following FIGS. 12A and 12B.

As illustrated in FIG. 13A, after the necessary number of layers of helical-winding is performed, the mandrel transferring frame 11 moves to the end side (on the left of FIG. 13A) of the machine frame 10, and the helical winding head 13 is placed on the other end side (on the right of FIG. 13A) of the mandrel transferring frame 11. Thus, the fiber bundles R fed from the helical winding head 13 are wound around each of the delivery rings 31, 32.

Figure 13B:
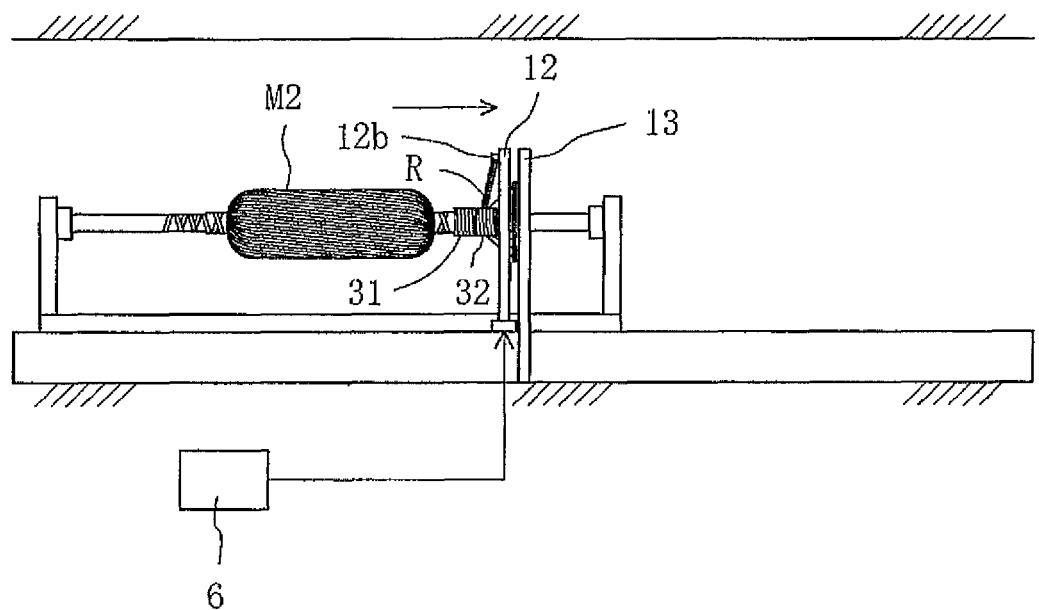

As illustrated in FIG. 13B, after the necessary layers of hoop-winding is performed, the hoop winding head 12 moves to the end side (on the right of FIG. 13B) of the mandrel M2. Thus, the fiber bundles R fed from the bobbins 12b are wound around each of the delivery rings 31, 32.

Accordingly, the fiber bundles R fed from the heads 12 and 13 are wound around and retained by each of the delivery rings 31, 32.

As described above, the fiber bundles R wound around the mandrel M2 have the first delivery ring 31 (the delivery ring on the side of the mandrel M) as a leading edge, and the second delivery ring 32 (the delivery ring on the opposite side of the mandrel M) as a trailing edge.

[Cutting Operation]

Figure 14A:
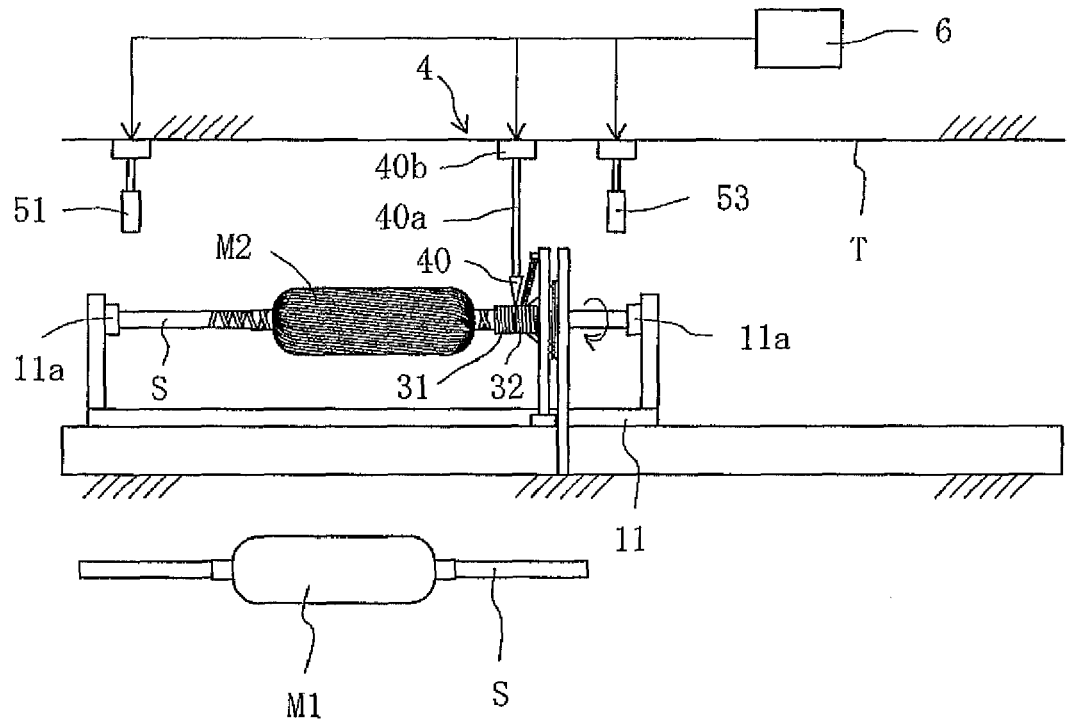
FIGS. 14A and 14B are side views following FIGS. 13A and 13B.

As illustrated in FIG. 14A, the filament winding apparatus includes a cutting device 4. The cutting device 4 includes a cutter portion 40. The cutter portion includes a telescopic arm 40a and a transfer base 40b. The cutter portion 40 is drive-controlled by the control unit 6.

The cutter portion 40 places its blade edge between the delivery rings 31, 32. The delivery rings 31, 32 are rotated along with the mandrel M2 by the mandrel rotation drive units 11a. Thus, the fiber bundles R wound around each of the delivery rings 31, 32 are cut between the delivery rings 31, 32 and separated.

[Discharging Operation]

Figure 14B:
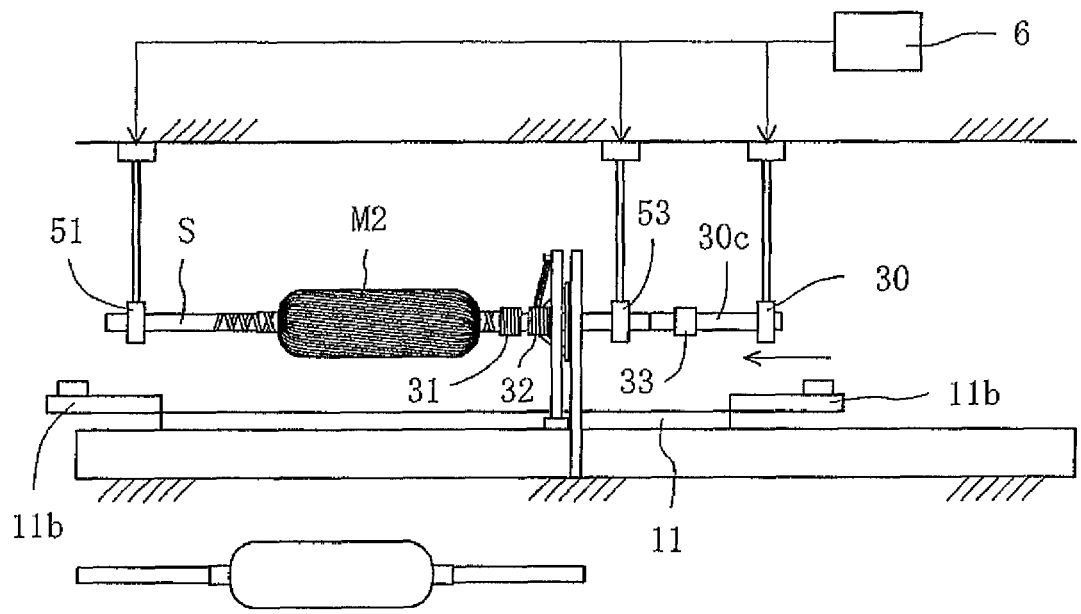

As illustrated in FIG. 14B, the first and third setting/discharging hand portions 51, 53 respectively grip both sides of the mandrel spindle S to hold the mandrel M2. In this state, the side wall portions 11b of the mandrel transferring frame 11 are folded so that the bundle-wound mandrel M2 can be discharged from the winding position or the not-yet-wound mandrel M1 can be set from the winding position.

The delivery hand portion 30 moves the delivery spindle 30c. The delivery spindle 30c holds the third delivery ring 33. The delivery hand portion 30 has one end (on the left of FIG. 14B) of the delivery spindle 30c in contact with the end (on the right of FIG. 14B) of the mandrel spindle S.

Figure 15A:
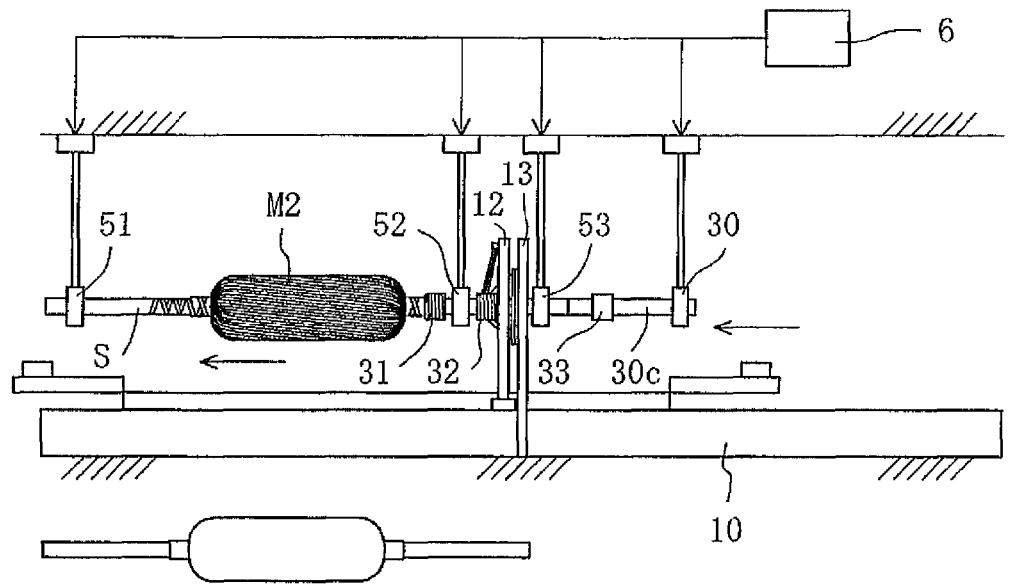
FIGS. 15A and 15B are side views following FIGS. 14A and 14B.

As illustrated in FIG. 15A, in the state in which the spindles S and 30c are in contact with one another, the first, third setting/discharging hand portions 51, 53 and the delivery hand portion 30 slightly move the mandrel M2 and the delivery spindle 30c towards one end side (on the left of FIG. 15A) of the machine frame 10.

At this time, the chuck mechanisms of the hoop winding head 12 and the helical winding head 13 do not hold the first delivery ring 31 (the second delivery ring 32 is positionally fixed). Accordingly, the first delivery ring 31 moves away along with the mandrel M2 from the second delivery ring 32.

The second setting/discharging hand portion 52 grips and holds the mandrel spindle S between the delivery rings 31, 32. Thus, the first and second setting/discharging hand portions 51, 52 respectively hold both ends of the mandrel M2. Then, the third setting/discharging hand portion 53 retreats.

In the state in which the spindles S and 30c are in contact with one another, the first and second setting/discharging hand portions 51, 52 and the delivery hand portion 30 move the mandrel spindle S and the delivery spindle 30c towards one end side (on the left of FIG. 15A) of the machine frame 10.

Figure 15B:
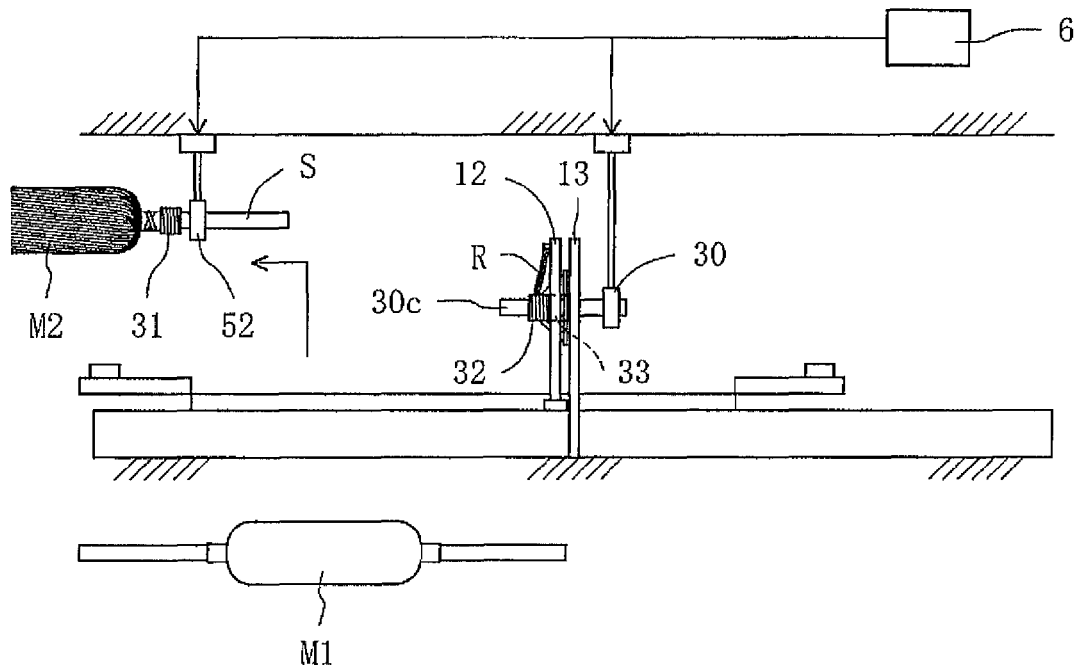

As illustrated in FIG. 15B, the second delivery ring 32 is fit (delivered) from the mandrel spindle S to the delivery spindle 30c and then held. The third delivery ring 33 is connected with the second delivery ring 32 by the removal mechanism. The delivery spindle 30c holds the second and third delivery rings 32, 33.

The first and second setting/discharging hand portions 51, 52 discharge the bundle-wound mandrel M2 from the winding position. In the above manufacturing process, one bundle-wound mandrel M2 (product) is completed.

The fiber bundles R fed from the hoop winding head 12 and the helical winding head 13 are wound around and held by the second delivery ring 32. FIG. 15B corresponds to FIG. 8B.

[Delivery Operation]

Next, the above-described setting operation (FIGS. 9A-10A) and winding operation (FIGS. 10B-13B) are performed. The fiber bundles R fed from the hoop winding head 12 and the helical winding head 13 are wound around a next mandrel M1 from the second delivery ring 32. Accordingly, the second delivery ring 32 delivers (transfers) the fiber bundle R from the bundle-wound mandrel M2 to the next not-yet-wound mandrel M1.

After the winding operation completion, the fiber bundles R wound around the mandrel M2 are wound around the third delivery ring 33. Then, the cutting operation (FIG. 14A) and the discharging operation (FIGS. 14A-15B) are performed. Then, the third delivery ring 33 delivers (transfers) the fiber bundles R from the bundle-wound mandrel M2 to a next not-yet-wound mandrel M1.

[Repeating Operation]

As described above, the setting operation, the winding operation, the cutting operation, the discharging operation and the delivery operation (FIGS. 9-15) are repeated, and thus, a manufacturing line can be automated with little task for the operator.

[Timing Chart]

FIG. 16 is a timing chart illustrating the timing and a rotation direction of the bobbin circulation of the hoop winding head and of the mandrel rotation.

As illustrated in FIG. 16, rotation of the mandrel M is stopped during hoop-winding, and the bobbins 12b of the hoop winding head 12 circulate in the forward direction 60a (FIG. 10B). Thus, the fiber bundles R are wound around the mandrel M to perform hoop-winding. After hoop-winding is completed, rotations etc. of the mandrel M and the bobbins 12b are stopped, and predetermined operations such as a shape checking operation, for example, are performed.

Then, the hoop winding head 12 is placed on the mandrel spindle S away from the mandrel M by the predetermined distance W. While the hoop winding head 12 is moving away from the mandrel M, the bobbins 12b circulate in the forward direction 60a (FIG. 11A). Thus, the hoop winding head 12 winds the fiber bundles R around the mandrel spindle S to perform a hoop disposal winding. Then, the bobbins 12b stop circulating, and the predetermined operations are performed.

Then, the mandrel M rotates in the reverse direction 60b during helical-winding, and the bobbins 12b circulate in synchronicity in the reverse direction 60b (FIG. 11B). Accompanying rotation of the mandrel M, the fiber bundles R are fed from the helical winding head 13 and wound around the mandrel M to perform helical-winding. Synchronized with rotation of the mandrel M, by circulating the bobbins 12b in the same direction 60b at the same rotation speed (the same number of rotations) during helical-winding, the fiber bundles R are not fed from the hoop winding head 12 (bobbins 12b), and a wasteful fiber bundle (wasted fiber) can be prevented from being discharged.

While the present invention has been described with respect to embodiments thereof, it will be apparent to those skilled in the art that the disclosed invention may be modified in numerous ways and may assume many embodiments other than those specifically set out and described above. Accordingly, the appended claims cover all modifications that fall within the true spirit and scope of the present invention.

What is claimed is:

1. A filament winding apparatus that hoop-winds and helical-winds fiber bundles around a mandrel, the filament winding apparatus comprising:
    a control unit that controls the filament winding apparatus;
    a rotation mechanism that rotates the mandrel;
    a hoop winding head that performs hoop-winding; and
    a helical winding head that performs helical-winding, wherein
    the hoop winding head includes:
    bobbins that feed the fiber bundles to the mandrel; and
    a circulation mechanism that circulates the bobbins around the mandrel, and
    the control unit controls the rotation mechanism and the circulation mechanism such that the mandrel is rotated and the bobbins are circulated in a same direction during helical winding.

2. The filament winding apparatus according to claim 1, wherein the control unit controls the rotation mechanism and the circulation mechanism such that the mandrel stops rotating and the bobbins are circulated in a reverse direction to the same direction during hoop winding.

3. The filament winding apparatus according to claim 1, wherein the control unit controls the rotation mechanism and the circulation mechanism such that rotation of the mandrel is synchronized with circulation of the bobbins during helical winding, and wasted fiber is not discharged.

4. The filament winding apparatus according to claim 1, comprising:
    a mandrel transferring mechanism that transfers the mandrel; and
    a hoop winding head transferring mechanism that transfers the hoop winding head, wherein
    the control unit controls the mandrel transferring mechanism and the hoop winding head transferring mechanism such that the hoop winding head retreats from the mandrel by a predetermined, distance during helical-winding.

5. The filament winding apparatus according to claim 4, wherein the control unit:
    controls the mandrel transferring mechanism and the hoop winding head transferring mechanism to move the hoop winding head in synchronicity with the mandrel transferring mechanism to maintain the predetermine distance during helical winding; and
    controls the rotation mechanism and the circulation mechanism such that rotation of the mandrel is synchronized with circulation of the bobbins during helical winding, and wasted fiber is not discharged.

* * * * *